(12) United States Patent
Oswald et al.

(10) Patent No.: US 11,570,989 B2
(45) Date of Patent: Feb. 7, 2023

(54) METHODS FOR INCREASING SECONDARY METABOLITE PRODUCTION IN CANNABIS

(71) Applicant: Abstrax Tech Inc., Tustin, CA (US)

(72) Inventors: Iain Oswald, Irvine, CA (US); Kevin Koby, Irvine, CA (US); Thomas J. Martin, Irvine, CA (US)

(73) Assignee: Abstrax Tech Inc., Tustin, CA (US)

( * ) Notice: Subject to any disclaimer, the term of this patent is extended or adjusted under 35 U.S.C. 154(b) by 0 days.

(21) Appl. No.: 17/852,605

(22) Filed: Jun. 29, 2022

(65) Prior Publication Data

US 2023/0000080 A1  Jan. 5, 2023

Related U.S. Application Data

(60) Provisional application No. 63/216,667, filed on Jun. 30, 2021.

(51) Int. Cl.
*A01N 43/38* (2006.01)
*C05D 1/02* (2006.01)
*A01P 21/00* (2006.01)

(52) U.S. Cl.
CPC .............. *A01N 43/38* (2013.01); *A01P 21/00* (2021.08); *C05D 1/02* (2013.01)

(58) Field of Classification Search
CPC combination set(s) only.
See application file for complete search history.

(56) References Cited

U.S. PATENT DOCUMENTS 5,300,481 A * 4/1994 O'Neill .................. A01N 43/38
504/284

FOREIGN PATENT DOCUMENTS

| AU | 2020102230 | * | 10/2020 |
| CN | 106973903 | * | 7/2017 |
| CN | 110150119 | * | 8/2019 |
| CN | 113016389 | * | 6/2021 |

OTHER PUBLICATIONS

Machine translation of CN 113016389, Jun. 25, 2021.*
Machine translation of CN 110150119, Aug. 23, 2019.*
Machine translation of CN 106973903, Jul. 25, 2017.*

* cited by examiner

*Primary Examiner* — John Pak
(74) *Attorney, Agent, or Firm* — Foley & Lardner LLP

(57) ABSTRACT

Compositions and methods of using exogenous antioxidant compounds and additives for *cannabis* and hemp production and growth and methods for enhancing the production of secondary metabolites and alleviating stress in *cannabis* and hemp plants are described.

7 Claims, 7 Drawing Sheets

METHODS FOR INCREASING SECONDARY METABOLITE PRODUCTION IN CANNABIS

CROSS-REFERENCE TO RELATED APPLICATIONS

This application claims the benefit, under 35 U.S.C. § 119(e), of the filing date of provisional U.S. Patent Application No. 63/216,667, filed Jun. 30, 2021, the entire disclosure of which is hereby incorporated by reference.

FIELD

The present technology is generally related to enhancing the production of secondary metabolites in *cannabis* and hemp. In particular, the present technology is related to compositions and methods for enhancing the essential oil content in *cannabis* and hemp plants.

BACKGROUND

*Cannabis* is a genus of flowering plants in the family Cannabaceae. The plant is also known as hemp, although this term is commonly used to refer to varieties of *Cannabis* cultivated for non-drug use. *Cannabis* is a complex plant with over 400 chemical entities of which more than 60 of them are cannabinoid compounds, some of them with opposing effects. The two most researched compounds in *cannabis* plant are delta-9-tetrahydrocannabinol (THC) and cannabidiol (CBD). Traditional cultivation methods for *cannabis* plants are based on large-scale automatically controlled cultivation management facility using soil with automatic watering arrangement, or hydroponic or aeroponic systems like cultivation channels. A soil pH between 5.8 and 6.5 is generally used, although it can be adjusted beyond these values. Nutrients are taken up from the soil by roots and can be exogenously added in the form of fertilizers.

Traditional cultivation conditions and fertilizers used for *cannabis* are unable to provide a consistent condition such that the cannabinoid and essential oil components of the *cannabis* are reproducibly expressed from the same strain of *cannabis*. Additionally, improper growing conditions cause various forms of stress, such as nutrient stress, temperature stress, light stress and water stress, which can stunt or halt plant growth, damage the plant, or in the worst case cause them to die. Thus, there is an unmet need to provide compositions and methods for cultivating *cannabis* under conditions and using nutrient compositions to ensure increased productivity and quality of *cannabis*, which reproducibly express and produce the desired components, while at the same time reduce or alleviate stress. The present technology addresses such unmet need.

SUMMARY

In one aspect, provided is a composition for application to a *Cannabis* plant, which includes an antioxidant compound and a fertilizer. In any embodiment, the antioxidant compound is selected from melatonin, 6-hydroxymelatonin, N-acetylserotonin, or a combination of any two or more thereof. In any embodiment, the antioxidant compound is melatonin. In any embodiment, the fertilizer includes a growth medium and additive nutrients. In any embodiment, the growth medium is selected from foliar spray, soil, compost, an aeroponic growth medium, a hydroponic growth medium, and a combination of any two or more thereof. In any embodiment, the additive nutrient is selected from the group consisting of potassium sulfate, ammonium sulfate, sodium thiosulfate, ammonium thiosulfate, potassium thiosulfate, potassium nitrate, ammonium nitrate, urea, calcium nitrate, sodium nitrate and molasses. In any embodiment, the fertilizer includes inorganic salts and organic nutrients. In any embodiment, the fertilizer includes sulfate salts and molasses. In any embodiment, the additive nutrient is selected from the group consisting of potassium sulfate, ammonium sulfate, potassium nitrate, ammonium nitrate, urea, calcium nitrate, sodium nitrate and molasses. In any embodiment, the additive nutrient is potassium sulfate. In any embodiment, the composition enhances the content of one or more essential oils in a *cannabis* plant. In any embodiment, the composition alleviates stress in a *cannabis* plant. In any embodiment, the composition includes melatonin, a growth medium and potassium sulfate. In any embodiment, the composition includes melatonin, water and potassium sulfate.

In one aspect, provided is a method for enhancing the content of one or more essential oils in a *cannabis* plant, the method comprising applying to the *cannabis* plant, a composition comprising an endogenous antioxidant compound. In another aspect provided is a method for alleviating one or more of salt stress, temperature stress, spectral stress and drought stress in a *cannabis* plant, wherein the method includes applying to the *cannabis* plant, a composition comprising an endogenous antioxidant compound. In any embodiment of the methods, the antioxidant compound is selected from melatonin, 6-hydroxymelatonin, N-acetylserotonin, or a combination of any two or more thereof. In any embodiment of the methods, the antioxidant compound is melatonin. In any embodiment of the methods, the fertilizer includes a growth medium and additive nutrients. In any embodiment of the methods, the growth medium is selected from foliar spray, soil, compost, an aeroponic growth medium, a hydroponic growth medium, and a combination of any two or more thereof. In any embodiment of the methods, the additive nutrient is selected from the group consisting of potassium sulfate, ammonium sulfate, sodium thiosulfate, ammonium thiosulfate, potassium thiosulfate, potassium nitrate, ammonium nitrate, urea, calcium nitrate, sodium nitrate and molasses. In any embodiment of the methods, the composition is to the *cannabis* plant applied during cultivation. In any embodiment of the methods, the composition is applied as a foliar spray.

In another embodiment, provided is a method for exogenously adding an endogenous antioxidant compound to a plant growth medium. In one aspect, a method of using melatonin as a nutrient or additive applied during *cannabis* cultivation. In other aspects, provided are methods of using melatonin as a means to enhance one or more of cannabinoid production, volatile aroma compound production, or the total essential oil content of *cannabis*. In other aspects, provided are methods of using melatonin in conjunction with inorganic salts as a nutrient for plants. In some further aspects, provided are methods of using an antioxidant (e.g., melatonin) in conjunction with inorganic salts or organic nutrients (e.g., molasses based products) for plants. In one aspect, provided are methods for alleviating one or more of salt stress, temperature stress, spectral stress and drought stress.

DETAILED DESCRIPTION

Figure 1:
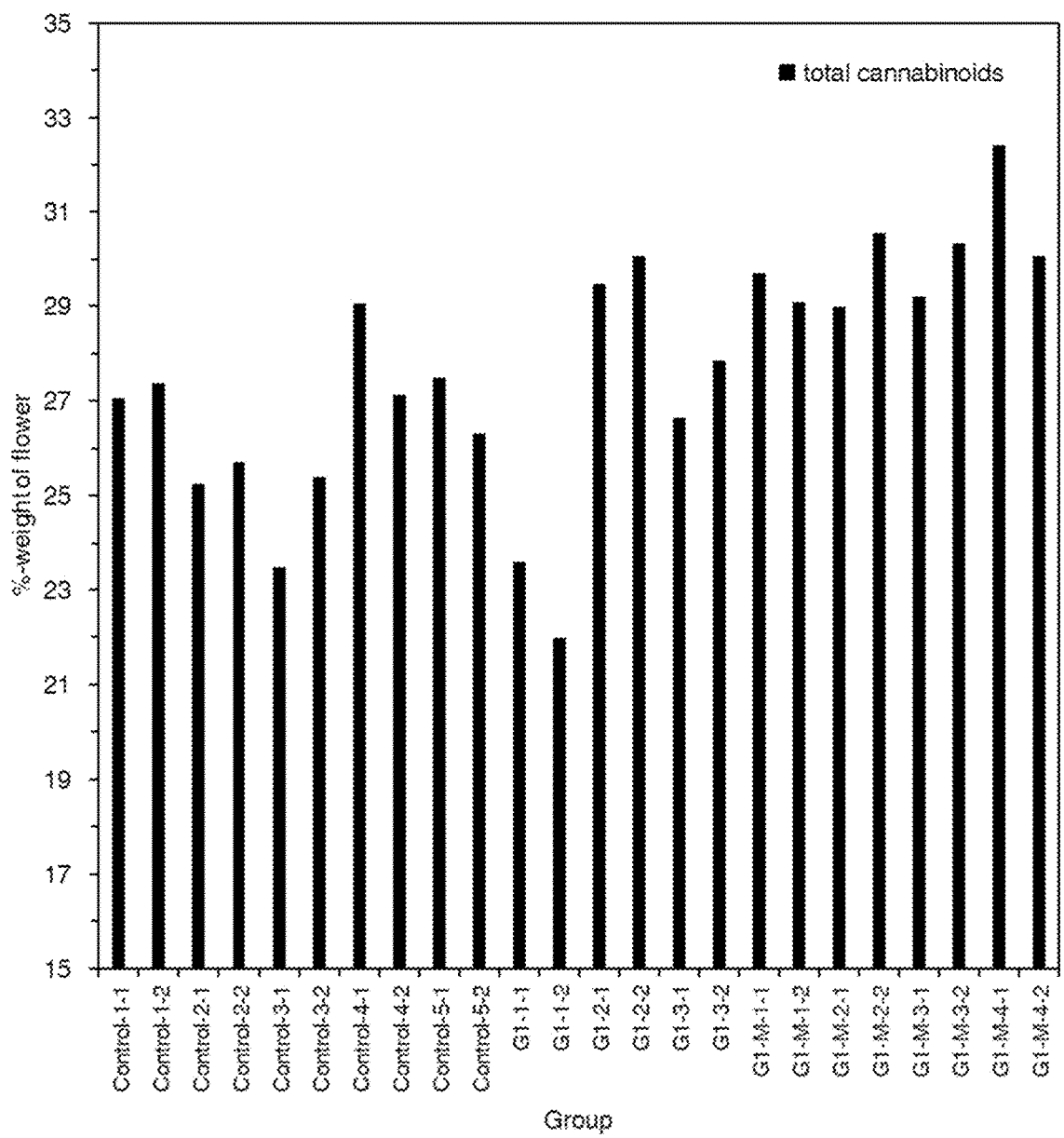
FIG. 1 is a plot illustrating total cannabinoid concentration (%-weight) for each sample measured.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "plant" refers to any member belonging to the kingdom Plantae, whether naturally occurring, completely manmade, or any combination thereof. This includes trees, herbs, bushes, grasses, veins, ferns, mosses and green algae. Illustrative plants include, for example, hemp and plants of the genus *Cannabis*, including but not limited to, *Cannabis sativa, Cannabis indica*, and *Cannabis ruderalis*. The term "*cannabis* plant" as used herein includes both *cannabis* and hemp plants.

As used herein, the term "growth medium" refers to any medium containing nutrients and materials suitable for plant growth. This includes, for example, foliar spray, soil, compost, aeroponic or hydroponic growth media.

The term "cannabinoid" as used herein is understood to be substances capable of activating cannabinoid receptors present in cells. Cannabinoids include phytocannabinoids, synthetic cannabinoids, endocannabinoids. Phytocannabinoids are cannabinoids of natural origin that can be found in plants of the genus *Cannabis*. Non-limiting examples of phytocannabinoids include Δ9-tetrahydrocannabinol (D9-THC), Δ8-tetrahydrocannabinol (D8-THC), tetrahydrocannabinol acid (THC-A), tetrahydrocannabivarin (THCV), tetrahydrocannabivarin acid (CBD)-Cababidol (THCV)), cannabidiol acid (CBD-A), cannabicromene (CBC), cannabidivarine (CBDV), cannabidivarine acid (CBDV-A), cannabigerol (CBG), cannabigerol acid (CBG-A), cannabigerovarin (CBGV), cannabinol (CBN), cannabinovarin (CBNV), and combinations thereof. Synthetic cannabinoids are compounds capable of interacting with cannabinoid receptors and are found neither endogenously nor in plants. Non-limiting examples of synthetic cannabinoids include dronabinol, nabilone, rimonabant and combinations thereof. Endocannabinoids are man-made substances capable of activating cannabinoid receptors. Non-limiting examples of endocannabinoids include anandamide (AEA), 2-arachidonylglycerol (2-AG), 2-arachidonyl glyceryl ether, AA arachidonoyl dopamine (NADA), and virodhamine (OAE). Pharmaceutically acceptable salts and acids of these cannabinoid compounds are also included.

*Cannabis* produces many unique secondary metabolites including but not limited to cannabinoids and terpenoids. *Cannabis* oil contains a diverse mixture of compounds, including a wide range of cannabinoid materials, and non-cannabinoid materials. Cannabinoids such as tetrahydrocannabinol (THC) and cannabidiol (CBD) are the major psychoactive components of the essential oil of the plant, whereas terpenoids are the major source of the scent or aroma of *cannabis*. As these compounds constitute the major fraction of the essential oil of *cannabis* while also being the most desired, it is of interest to maximize the concentrations of these compounds. The present technology provides compositions and methods to achieve this objective.

In one embodiment, provided is a plant growth composition that includes an antioxidant compound. In one embodiment, provided is a composition for application to a *Cannabis* plant that includes an antioxidant compound and a fertilizer. Suitable antioxidant compounds may include melatonin, 6-Hydroxymelatonin, N-Acetylserotonin, or a combination thereof. Several other endogenous antioxidants are known in the art and commercially available, and can be used in the compositions. In some embodiment, the antioxidant compound includes melatonin or derivatives thereof. In some embodiments, the antioxidant compound is melatonin.

The fertilizer used in the compositions and methods can be chemical or organic, liquid or powder, and usually contain a mixture of ingredients. For example, the fertilizer may include a growth medium and additive nutrients suitable for *cannabis* plant growth. Suitable growth medium may include, without limitation, foliar spray, soil, compost, aeroponic growth medium, hydroponic growth medium, or a combination of any two or more thereof. The additive nutrients may include both macronutrients and micronutrients such as for example, sources of nitrogen, sodium, potassium, calcium, magnesium, sulfur, phosphorus, chlorine, iron, boron, manganese, sodium, zinc, copper, nickel, and molybdenum, and the like and combinations thereof. Suitable additive nutrients in the compositions may include, without limitation, nitrogen fertilizers, phosphate fertilizers, potassium fertilizers, organic fertilizers and exogenous additives. In some embodiments, the composition may include exogenous additives. In some embodiments, the exogenous additives may include organic nutrients, such as for example, molasses or molasses based products. In some embodiments, the exogenous additives may include inorganic salts. In some embodiments, the inorganic salts may include sulfate salts. The sulfate salts may include, for example, alkali metal sulfates or alkaline earth metal sulfates. In some embodiments, the composition may include an exogenous additive selected from the group consisting of potassium sulfate, ammonium sulfate, sodium thiosulfate, ammonium thiosulfate, potassium thiosulfate, potassium nitrate, ammonium nitrate, urea, calcium nitrate, and sodium nitrate. In some embodiments, the sulfate salt includes potassium sulfate.

In some embodiments, provided is a composition that includes an endogenous antioxidant, a growth medium and an exogenous additive. In some embodiments, the composition includes melatonin, a growth medium and a sulfate salt. In some embodiments, the sulfate salt includes potassium sulfate. In one embodiment, provided is a composition that includes an antioxidant compound and an exogenous additive. In some embodiments, the composition includes an endogenous antioxidant selected from melatonin, 6-Hydroxymelatonin, N-Acetylserotonin, or a combination thereof and an exogenous additive selected from potassium sulfate, ammonium sulfate, sodium thiosulfate, ammonium thiosulfate, potassium thiosulfate, potassium nitrate, ammonium nitrate, urea, calcium nitrate, and sodium nitrate. In some embodiments, the composition includes melatonin and potassium sulfate. In some embodiments, the composition includes melatonin, molasses and potassium sulfate.

In one aspect, provided herein are methods for altering the content of one or more essential oils in a *cannabis* plant, wherein the method includes applying to the *cannabis* plant, a composition comprising an endogenous antioxidant compound. In some embodiments, the method for altering the content of one or more essential oils in a *cannabis* plant includes applying to the *cannabis* plant, a composition comprising melatonin. In addition to the antioxidant, the composition may further include a fertilizer. As described herein, the fertilizer may include a growth medium and additive nutrients. In some embodiments, the composition is applied during *cannabis* cultivation. In some embodiments, the composition is applied as a foliar spray. In some embodiments, the composition is applied to the plant root system.

In one embodiment, the method includes enhancing the content of one or more essential oil in *cannabis*. In some embodiments, the method includes enhancing the total essential oil content in *cannabis*. In some embodiments, the method includes enhancing cannabinoid production in *cannabis* plants. In other embodiments, the method includes enhancing volatile aroma compound production. In some embodiments, the method includes addition of an endogenous antioxidant compound to a plant growth medium.

The methods may include enhancing the content of *cannabis* essential oil, which may include cannabinoids, as well as terpenes. For example, the *cannabis* essential oils may include cannabinoids, which includes both active and acidic components. For example, the methods may enhance the total THC content, which includes both THC and THCA, and/or it may enhance the total CBD content, which includes both CBD and CBDA. Suitable essential oils may include, without limitation, tetrahydrocannabinol (THC), cannabidiol (CBD), cannabinol (CBN), cannabichromene (CBC), cannabigerol (CBG), cannabinodiol (CBND), cannabicyclol (CBL), hypocannabinol (CBV), Tetrahydrocannabivarin (THCV), hypocannabinol Phenol (CBDV), Cannabichromevarin (CBCV), Cannabigerovarin (CBGV), Cannabichromenic acid monomethyl ether (CBGM), tetrahydrocannabinolic acid (THCA), cannabidiolic acid (CBDA), cannabinolic acid (CBNA), cannabichromenic acid (CBCA), cannabigerolic acid (CBGA), cannabinodiolic acid (CBNDA), cannabicyclolic acid (CBLA), cannabivarinic acid (CBVA), tetrahydrocannabivarinic acid (THCVA), cannabidivarinic acid (CBDVA), cannabichrovarinic acid (CBCVA), cannabigerovarinic acid (CBGVA), cannabigerol monomethylether (CBGM), cannabigerolic acid monomethylether (CBGAM), and a combination of any two or more thereof. In some embodiments, the method includes enhancing the total cannabinoid content in a *cannabis* plant. In some embodiments, the method includes enhancing the content of one or more essential oil component selected from the group consisting of THC, THCA, CBD, CBCA, CBDA, CBG and CBGA in a *cannabis* plant. In some embodiments, the method may include enhancing the total THC content in a *cannabis* plant. In some embodiments, the method may include enhancing the total CBD content in a *cannabis* plant. In some embodiments, the method may include enhancing the THCA content in a *cannabis* plant.

The methods may include enhancing the content of *cannabis* essential oil, which includes terpenes. Suitable terpenes may include those which impart a specific aroma or flavor to the composition. Suitable terpenes may include, without limitation, D-Limonene, linalool, β-pinene, caryophyllene, β-myrcene, α-terpineol, α-pinene, trans-β-ocimene, endo-fenchol, humulene, α or β-phellandrene, terpinolene, fenchyl alcohol, α-bisabolol, camphene, terpinolene, humulene, geraniol, camphor, cedrene, 1-menthol, cis-β-ocimene, trans-β-ocimene, terpinene, delta-3-carene, isoborneol, nerol, valencene, farnesene (t), fenchone, bergotamene, thujene, ylangene, sabinene hydrate, and the like. In some embodiments, the method may include enhancing the content of one or more terpenes in the *cannabis* plant. In some embodiments, the method may include enhancing the content of aroma imparting terpenes in a *cannabis* plant.

In another aspect, provided are methods for alleviating stress in plants. In one embodiment, the method includes applying to the plant, a composition comprising an endogenous antioxidant compound. In some embodiments, the method includes alleviating one or more of salt stress, temperature stress, spectral stress and drought stress in a *cannabis* plant, wherein the method includes applying to the *cannabis* plant, a composition comprising an endogenous antioxidant compound. In some embodiments, the method includes alleviating salt stress in a *cannabis* plant. In other embodiments, the method includes alleviating temperature stress in a *cannabis* plant. In yet other embodiments, the method includes alleviating spectral stress in a *cannabis* plant. In some embodiments, the method includes alleviating drought stress in a *cannabis* plant.

The present technology also provides methods for exogenously applying an endogenous antioxidant compound to a plant, e.g., in the form of a plant growth medium. The method may include exogenously applying the plant growth medium to the plant during *cannabis* cultivation. In some embodiments, the method may further include applying the plant growth medium to the root system of the *cannabis* plant or to the foliage or leaves as foliar spray. Suitable growth medium may include, without limitation, foliar spray medium, soil, compost, aeroponic growth medium, hydroponic growth medium, or a combination of any two or more thereof. In some embodiments, the endogenous antioxidant compound is melatonin. In some embodiments, provided is a method of using melatonin as a nutrient or additive applied during *cannabis* cultivation. In other embodiments, provided are methods of using melatonin as a means to enhance one or more of cannabinoid production, volatile aroma compound production, or the total essential oil content of *cannabis*. In some further embodiments, provided are methods of using an antioxidant (e.g., melatonin) in conjunction with inorganic salts (e.g., potassium sulfate) and/or organic nutrients (e.g., molasses or molasses based products) for methods described herein. In other embodiments, provided are methods for enhancing the production of other desired compounds, e.g., sulfur compounds, in *cannabis* and other plants of by applying to the plant an endogenous antioxidant such as melatonin.

Suitable endogenous antioxidant compounds used in the methods describe herein include melatonin, 6-hydroxymelatonin, N-acetylserotonin, or a combination of any two or more thereof. Suitable additive nutrients used in the methods describe herein may include, without limitation, nitrogen fertilizers, phosphate fertilizers, potassium fertilizers, organic fertilizers and exogenous additives. In some embodiments, the composition may include exogenous additives. In some embodiments, the exogenous additives may include organic nutrients, such as for example, molasses or molasses based products. In some embodiments, the exogenous additives may include inorganic salts. In some embodiments, the inorganic salts may include sulfate salts. The sulfate salts may include, for example, alkali metal sulfates or alkaline earth metal sulfates. In some embodiments, the composition may include an exogenous additive selected from the group consisting of potassium sulfate, ammonium sulfate, sodium thiosulfate, ammonium thiosulfate, potassium thiosulfate, potassium nitrate, ammonium nitrate, urea, calcium nitrate, and sodium nitrate. In some embodiments, the sulfate salt includes potassium sulfate.

As an application of the compositions and methods described herein, several different exogenous additives, e.g., sulfates such as $K_2SO_4$ alone or with the addition of antioxidants such as melatonin were tested. It was observed that exogenous additives, e.g., sulfates such as $K_2SO_4$ negatively affects cannabinoid and aroma compound production at the concentrations applied relative to a control group. Conversely, plants with exogenous additives, e.g., sulfates such as $K_2SO_4$, in combination with an antioxidant such as melatonin applied resulted in the highest cannabinoid and aroma compound production with the smallest standard deviation. These results reveal that although excess exogenous $K_2SO_4$ may negatively affect essential oil production, addition of an antioxidant, e.g., melatonin can counter these effects. The additives can be added applied as a foliar spray, added to the soil or applied hydroponically. The application of a composition including exogenous additives can significantly improve cannabinoid production as well as drastically influence the total content of the *cannabis* plant's essential oil. Additionally, that salt-stress can be alleviated by application of a composition including exogenous additives, resulting in unprecedented consistency in cannabinoid and/or volatile aroma compound production. Further, exogenous addition of endogenous antioxidants such a melatonin can enhance secondary metabolite production to increase the content of the *cannabis* plant essential oil.

The present technology, thus generally described, will be understood more readily by reference to the following examples, which are provided by way of illustration and are not intended to be limiting of the present invention.

EXAMPLES

Example 1: Nutrient Solution Preparation

Fertilizer grade $K_2SO_4$ was dissolved as a raw powder into distilled water with a concentration of 700 μM $K_2SO_4$. A 50 μM solution of food-grade melatonin was prepared as a foliar spray.

Example 2: Two-Dimensional Gas Chromatography

The major volatile aroma compounds of the flowers from the *Cannabis* plants were extracted using methanol as a solvent. 200 mg of flower was placed into a scintillation vial followed by mechanical grinding with a plastic disposable spatula. 2 mL of methanol was added to the flower and agitated for 15 minutes, followed by transferring 4 μL of the solution using a filtered syringe to a 20 mL headspace vial and crimped using an electric crimper.

GC×GC analysis was performed using the INSIGHT™ reverse fill flush flow modulator (SepSolve Analytical). This was coupled for data generation to an Agilent 7890B GC and BenchTOF Select Time of flight mass spectrometer (Markes International). Time-of-Flight Mass spectrometry (TOF-MS) was used to identify compounds. Quantification of compounds was done using a flame ionization detector (HD). Sample introduction was done using a Centri Sample Concentration Platform (Markes International).

For total aroma content analysis, samples were incubated and agitated at a temperature of 70° C. for 10 minutes, followed by a single 5 mL headspace injection from the headspace vial to a cryogen free cold trap held at 25° C. The cold trap was rapidly heated to 300° C. to desorb the sample in a narrow band onto the analytical columns. The GC×GC column configuration was a polar to apolar setup. The GC oven ramp rates used were as follows: The oven was initially set to 45° C. and held for 3 minutes. The oven was then ramped at a rate of 5° C. per minute to 90° C., followed a 2.0° C. ramp rate to 130° C., followed last by a 5° C. ramp rate to 240° C. The modulation period set for the flow modulator was 7.2 seconds.

Data was collected, integrated, and analyzed using the ChromSpace software platform (Sepsolve Analytical). Compounds were quantified from GC×GC-FID data with calibration curves using a 40-compound terpene standard (LGC Standards).

Example 3: Horticultural Analysis

12 *cannabis* clones of the gelato varietal were purchased from the Empire Connect dispensary in San Bernardino, Calif. and transplanted into individual soil containers. The clones were allowed to mature under constant light until they reached an appropriate height at which point lighting was changed from 12 hours of darkness and light to induce the flowering stage. The base nutrients used was Advanced Nutrients® brand and followed the suggested feeding schedule. Each group had exogenous amounts of their respective nutrient or additives as follows: 2 mL of the melatonin solution was applied as a foliar spray every 3 days from week 4 of flowering until week 8 to group G1-M. 50 mL of the $K_2SO_4$ solution were added to the soil every three days from week 4 until week 8 for both groups G1 and G1-M.

After the flowers were deemed fully mature, the plants were cut down and hung to cure and dry for 11 days at a temperature and relative humidity of 72° F. and 45% respectively to emulate the process used during commercial *cannabis* preparation.)

The 12 *cannabis* clones of the Gelato varietal were transplanted into soil. These were broken up into three groups with exogenous additives and/or nutrients as follows:
1. Control group—base nutrients (5 clones)
2. G1: Base nutrients with exogenous $K_2SO_4$ (3 clones)
3. G1+M: Base nutrients with exogenous $K_2SO_4$ and exogenous melatonin (4 clones)

Additives for each group were added over the course of plant growth as follows in the experimental section. After curing the flower, samples were taken to measure aroma compound and cannabinoid concentrations. Cannabinoid concentrations were measured by Bel Costa Labs, a third-party iso-certified *cannabis* testing facility. Two samples of inflorescence from each plant were measured to obtain an average for each plant. Results are shown in Table 1, while FIG. 1 shows the distribution of total cannabinoids across the samples measured.

Figure 2:
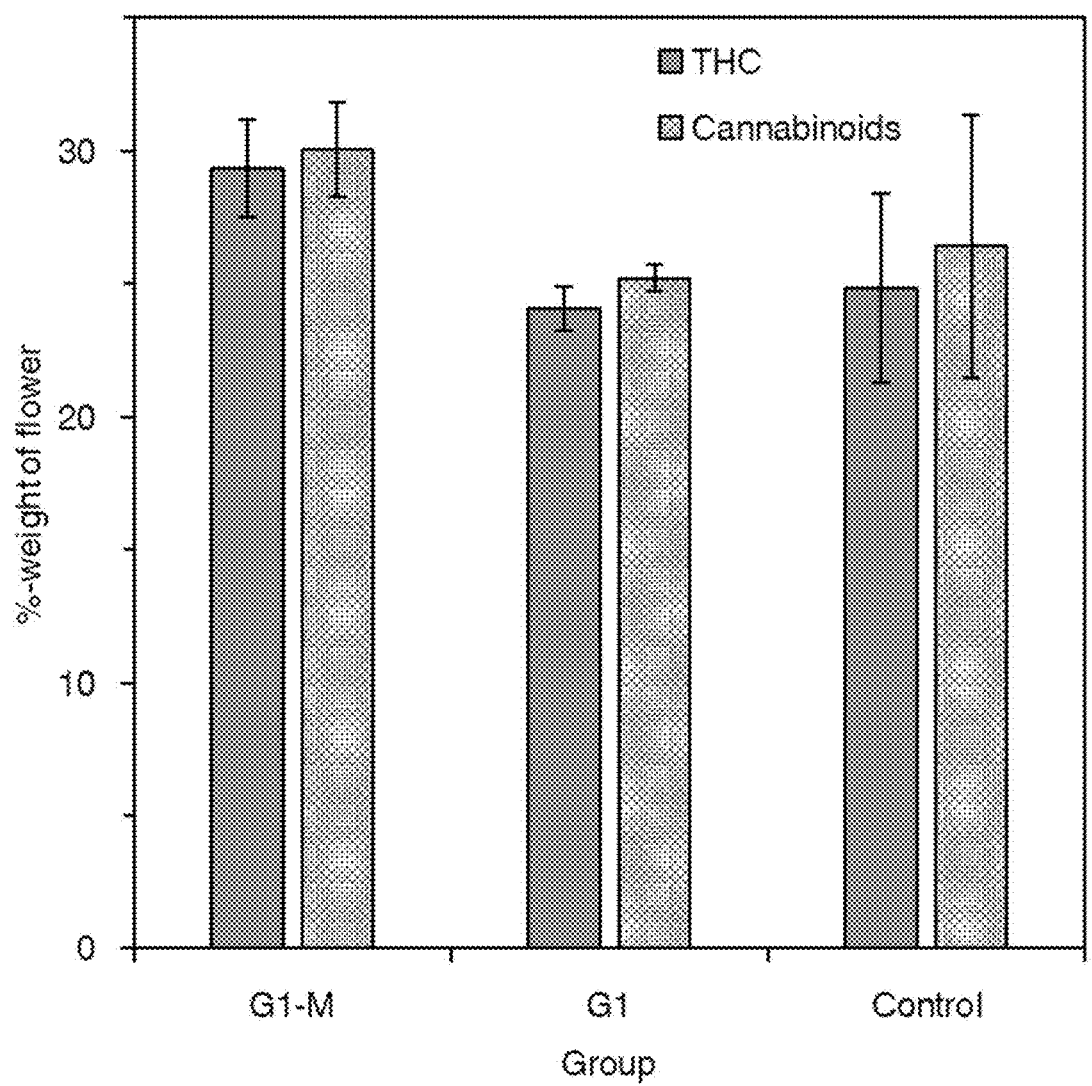
FIG. 2 is a plot illustrating THC and Cannabinoid average percent weights of each sample group.

As shown in FIG. 2, the average THC and total cannabinoid concentrations are significantly higher for G1-M compared to the control and G1. As cured *cannabis* can have variable water content (i.e. moisture), as shown in Table 2, moisture adjusted cannabinoid concentrations were calculated. These data normalize the cannabinoid content to account for water weight. These were calculated by the following equation:

$$\text{Moisture adjusted value} = \frac{\text{unadjusted value}}{100 - \text{moisture content}}$$

Figure 3:
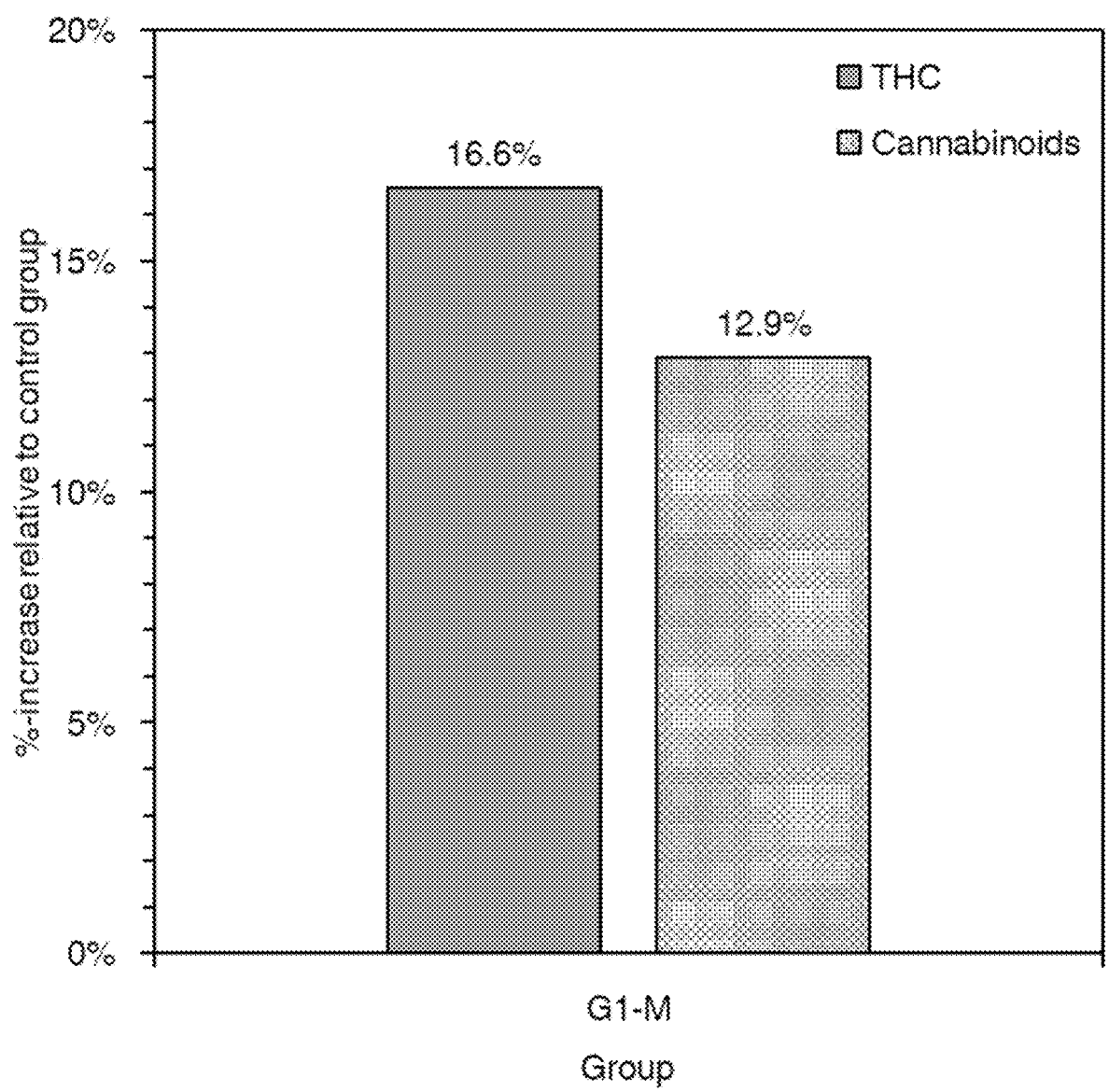
FIG. 3 is a plot illustrating the relative increase between G1-M and control group for THC and total cannabinoid content.

On the other hand, G1 has lower average THC and cannabinoid concentrations. These results suggest that $K_2SO_4$ has negative or negligibly positive effects. On the other hand, G1-M, which had both $K_2SO_4$ and melatonin additives applied simultaneously, had the highest concentrations of both THC and total cannabinoids. This data suggests that melatonin can alleviate the detrimental effects of excess $K_2SO_4$. More importantly, the standard deviation of G1-M is significantly smaller than other groups, suggesting that not only does melatonin enhance cannabinoid production relative to $K_2SO_4$, but also ensures consistent production across multiple samples. About ~15% increase was observed in average cannabinoid production in the melatonin-spiked samples relative to the control. More importantly, melatonin exposed plants exhibit extremely small deviations in cannabinoid production. In all groups except G1-M a wide range of possible cannabinoid content is seen. G1 and the control groups are particularly spread in their content. The control group's lowest total cannabinoid content was ~23.5%, while G1 was ~22%. On the other hand, the lowest cannabinoid content for G1-M was ~29%. This data suggests that melatonin effectively allows the *cannabis* plant to achieve optimal cannabinoid production even while under salt-stress. The relative increase to the control group is shown in FIG. 3.

TABLE 1

Raw cannabinoid data obtained from Gelato cultivar experiment.

| Sample | Total THC (%) | Total CBD (%) | Total cannabinoid (%) | CBCA (%) | CBDA (%) | CBG (%) | CBGA (%) | Moisture (%) |
|---|---|---|---|---|---|---|---|---|
| Control-1-1 | 22.43557 | 0.07293 | 27.05455 | 0.41751 | 0.08316 | 0.15548 | 0.76751 | 10 |
| Control-1-2 | 22.6379 | 0.07196 | 27.35664 | 0.3936 | 0.08205 | 0.15155 | 0.88414 | 12.5 |
| Control-2-1 | 21.085 | 0.06944 | 25.23718 | 0.33658 | 0.07918 | 0.14702 | 0.58696 | 10.2 |
| Control-2-2 | 21.55276 | 0.06656 | 25.69125 | 0.34987 | 0.07589 | 0.15542 | 0.60534 | 10 |
| Control-3-1 | 19.50094 | 0.06465 | 23.48007 | 0.25826 | 0.07372 | 0.09494 | 0.86344 | 13 |
| Control-3-2 | 21.5141 | 0.06627 | 25.38872 | 0.28435 | 0.07557 | 0.11217 | 0.53506 | 11.2 |
| Control-4-1 | 23.96803 | 0.06897 | 29.0578 | 0.34499 | 0.07864 | 0.15919 | 1.01887 | 10 |
| Control-4-2 | 22.47689 | 0.07047 | 27.13442 | 0.30208 | 0.08035 | 0.13648 | 1.0736 | 12.5 |
| Control-5-1 | 23.063 | 0.06828 | 27.48761 | 0.37782 | 0.07786 | 0.16072 | 0.63057 | 12 |
| Control-5-2 | 21.97305 | 0.06248 | 26.3113 | 0.35003 | 0.07124 | 0.14445 | 0.65636 | 12 |
| G1-1-1 | 19.97436 | 0.04758 | 23.60196 | 0.18461 | 0.05425 | 0.09425 | 0.67784 | 14.5 |
| G1-1-2 | 18.3671 | 0.04479 | 21.9967 | 0.19723 | 0.05107 | 0.09528 | 0.86498 | 14.7 |
| G1-2-1 | 24.56389 | 0.0533 | 29.46134 | 0.37364 | 0.06078 | 0.16969 | 0.84848 | 13.7 |
| G1-2-2 | 25.19024 | 0.05608 | 30.07598 | 0.33024 | 0.06395 | 0.1758 | 0.82531 | 15.2 |
| G1-3-1 | 22.25194 | 0.05686 | 26.63877 | 0.32173 | 0.06483 | 0.12684 | 0.76371 | 13.7 |
| G1-3-2 | 23.31985 | 0.05475 | 27.85475 | 0.32127 | 0.06243 | 0.12937 | 0.79211 | 12.7 |
| G1-M-1-1 | 24.8826 | 0.05725 | 29.71801 | 0.39471 | 0.06528 | 0.17902 | 0.74978 | 13 |
| G1-M-1-2 | 24.28033 | 0.05113 | 29.06953 | 0.3602 | 0.0583 | 0.17639 | 0.8226 | 13.5 |
| G1-M-2-1 | 24.33822 | 0.0602 | 28.97534 | 0.35755 | 0.06864 | 0.1439 | 0.71127 | 14.2 |
| G1-M-2-2 | 25.57046 | 0.06076 | 30.54075 | 0.40722 | 0.06928 | 0.1599 | 0.79791 | 16.9 |
| G1-M-3-1 | 24.11596 | 0.05301 | 29.19069 | 0.38356 | 0.06044 | 0.18214 | 1.00614 | 13.5 |
| G1-M-3-2 | 25.0827 | 0.05426 | 30.32658 | 0.38759 | 0.06187 | 0.04478 | 1.05573 | 15 |
| G1-M-4-1 | 27.1912 | 0.0638 | 32.40281 | 0.3504 | 0.07275 | 0.1959 | 0.84292 | 16 |
| G1-M-4-2 | 25.16392 | 0.0595 | 30.05834 | 0.33314 | 0.06784 | 0.16808 | 0.83009 | 13.7 |

TABLE 2

Moisture adjusted raw cannabinoid data obtained from Gelato cultivar experiment.

| Sample | Total THC (%) | Total CBD (%) | Total cannabinoid (%) | CBCA (%) | CBDA (%) | CBG (%) | CBGA (%) |
|---|---|---|---|---|---|---|---|
| Control-1-1 | 24.9284 | 0.0810 | 30.0606 | 0.4639 | 0.0924 | 0.1728 | 0.8528 |
| Control-1-2 | 25.8719 | 0.0822 | 31.2647 | 0.4498 | 0.0938 | 0.1732 | 1.0104 |
| Control-2-1 | 23.4800 | 0.0773 | 28.1038 | 0.3748 | 0.0882 | 0.1637 | 0.6536 |
| Control-2-2 | 23.9475 | 0.0740 | 28.5458 | 0.3887 | 0.0843 | 0.1727 | 0.6726 |
| Control-3-1 | 22.4149 | 0.0743 | 26.9886 | 0.2969 | 0.0847 | 0.1091 | 0.9925 |
| Control-3-2 | 24.2276 | 0.0746 | 28.5909 | 0.3202 | 0.0851 | 0.1263 | 0.6025 |
| Control-4-1 | 26.6311 | 0.0766 | 32.2864 | 0.3833 | 0.0874 | 0.1769 | 1.1321 |
| Control-4-2 | 25.6879 | 0.0805 | 31.0108 | 0.3452 | 0.0918 | 0.1560 | 1.2270 |
| Control-5-1 | 26.2080 | 0.0776 | 31.2359 | 0.4293 | 0.0885 | 0.1826 | 0.7166 |
| Control-5-2 | 24.9694 | 0.0710 | 29.8992 | 0.3978 | 0.0810 | 0.1641 | 0.7459 |
| G1-1-1 | 23.3618 | 0.0556 | 27.6046 | 0.2159 | 0.0635 | 0.1102 | 0.7928 |
| G1-1-2 | 21.5324 | 0.0525 | 25.7875 | 0.2312 | 0.0599 | 0.1117 | 1.0140 |
| G1-2-1 | 28.4634 | 0.0618 | 34.1383 | 0.4330 | 0.0704 | 0.1966 | 0.9832 |
| G1-2-2 | 29.7055 | 0.0661 | 35.4670 | 0.3894 | 0.0754 | 0.2073 | 0.9732 |
| G1-3-1 | 25.7844 | 0.0659 | 30.8676 | 0.3728 | 0.0751 | 0.1470 | 0.8849 |
| G1-3-2 | 26.7123 | 0.0627 | 31.9069 | 0.3680 | 0.0715 | 0.1482 | 0.9073 |
| G1-M-1-1 | 28.6007 | 0.0658 | 34.1586 | 0.4537 | 0.0750 | 0.2058 | 0.8618 |
| G1-M-1-2 | 28.0697 | 0.0591 | 33.6064 | 0.4164 | 0.0674 | 0.2039 | 0.9510 |
| G1-M-2-1 | 28.3662 | 0.0702 | 33.7708 | 0.4167 | 0.0800 | 0.1677 | 0.8290 |
| G1-M-2-2 | 30.7707 | 0.0731 | 36.7518 | 0.4900 | 0.0834 | 0.1924 | 0.9602 |
| G1-M-3-1 | 27.8797 | 0.0613 | 33.7465 | 0.4434 | 0.0699 | 0.2106 | 1.1632 |
| G1-M-3-2 | 29.5091 | 0.0638 | 35.6783 | 0.4560 | 0.0728 | 0.0527 | 1.2420 |
| G1-M-4-1 | 32.3705 | 0.0760 | 38.5748 | 0.4171 | 0.0866 | 0.2332 | 1.0035 |
| G1-M-4-2 | 29.1587 | 0.0689 | 34.8301 | 0.3860 | 0.0786 | 0.1948 | 0.9619 |

Example 4: Aroma Compound Analysis

Figure 4:
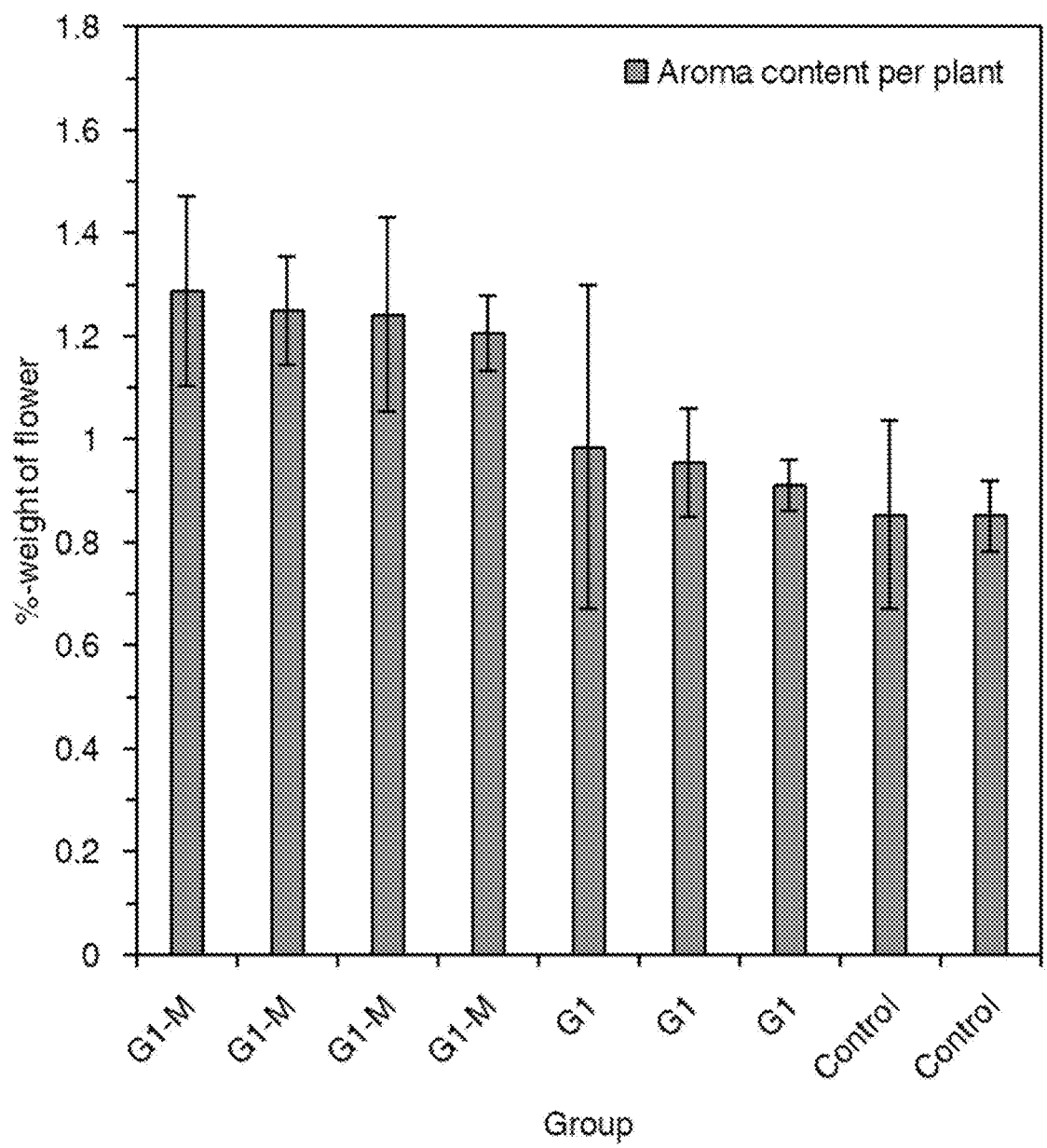
FIG. 4 is a plot illustrating the aroma content in weight percent of an average of 3 samples per individual plants.

Even greater increases in volatile aroma compound production than cannabinoids were observed for G1-M relative to both G1 and the control. Three different samples of the plants shown in FIG. 4 were measured to obtain an average. FIG. 4 shows the data for each plant ranked from highest to lowest. The aroma compounds include all terpenes and other compounds which impart aroma to composition.

Figure 5:
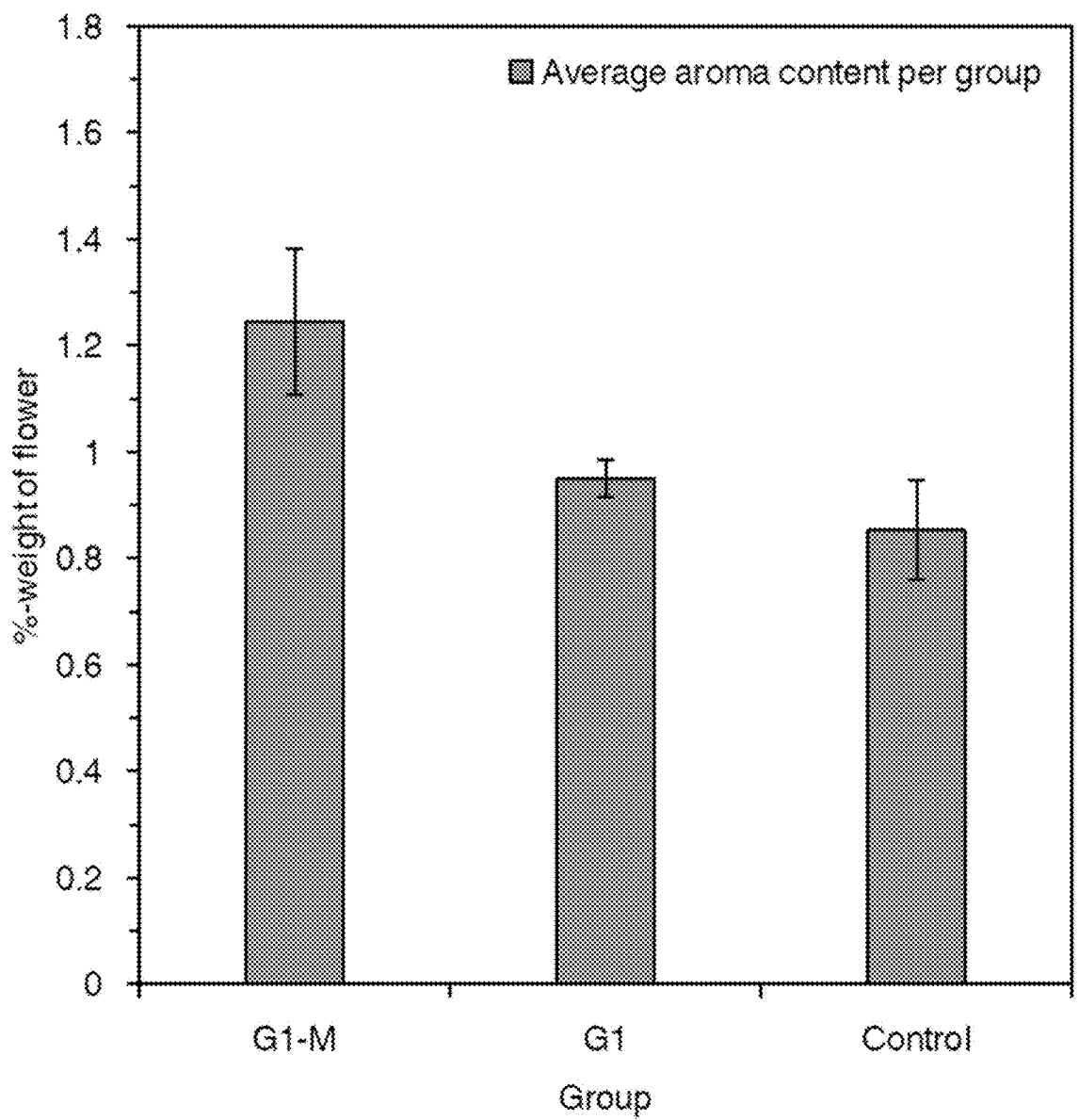
FIG. 5 is a plot illustrating the aroma content in weight percent of samples per group.
Figure 6:
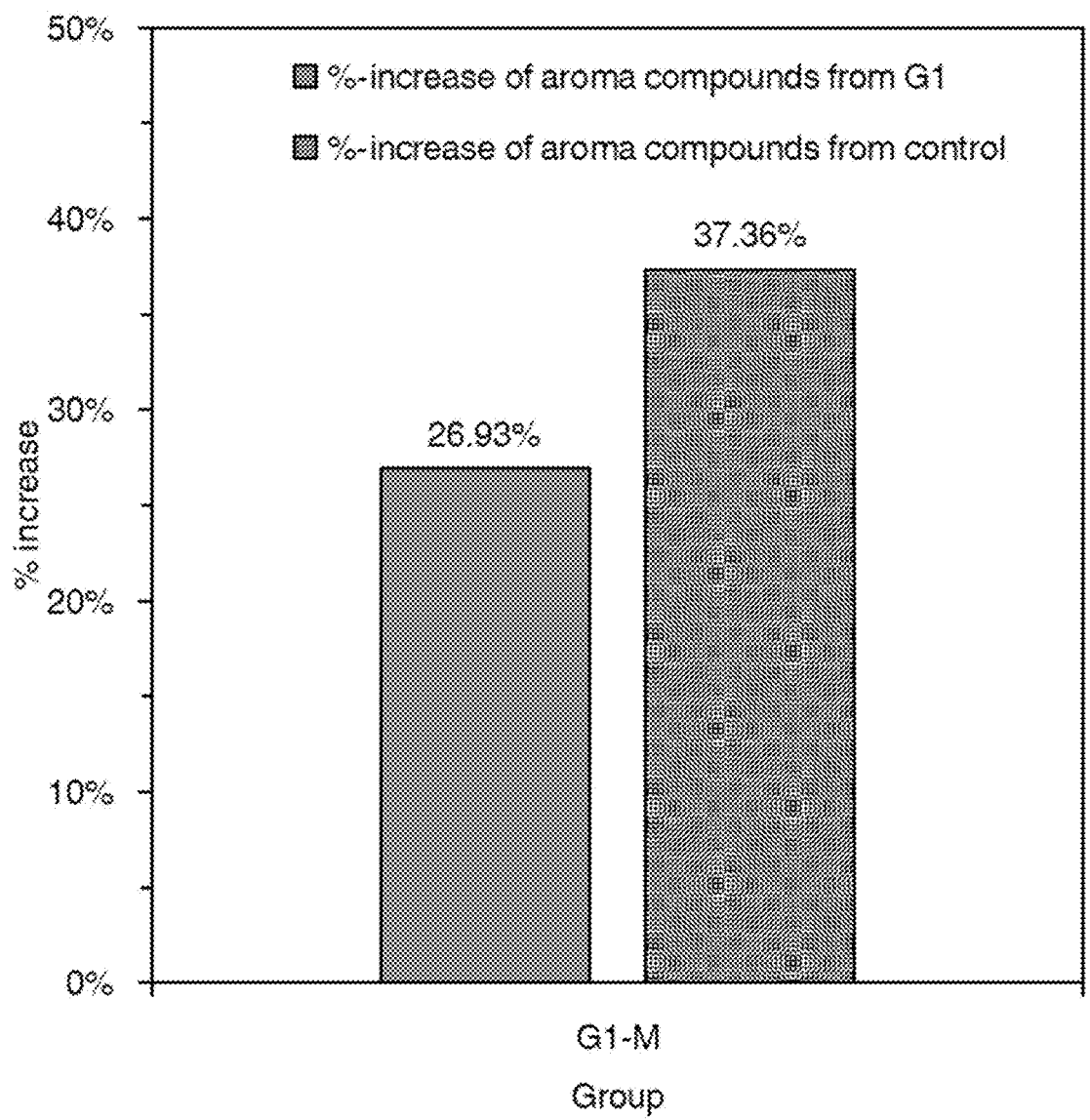
FIG. 6 is a plot illustrating the percent increase of aroma compounds between groups G1 and G1-M and percent increase of aroma compounds between control group and G1-M.
Figure 7:
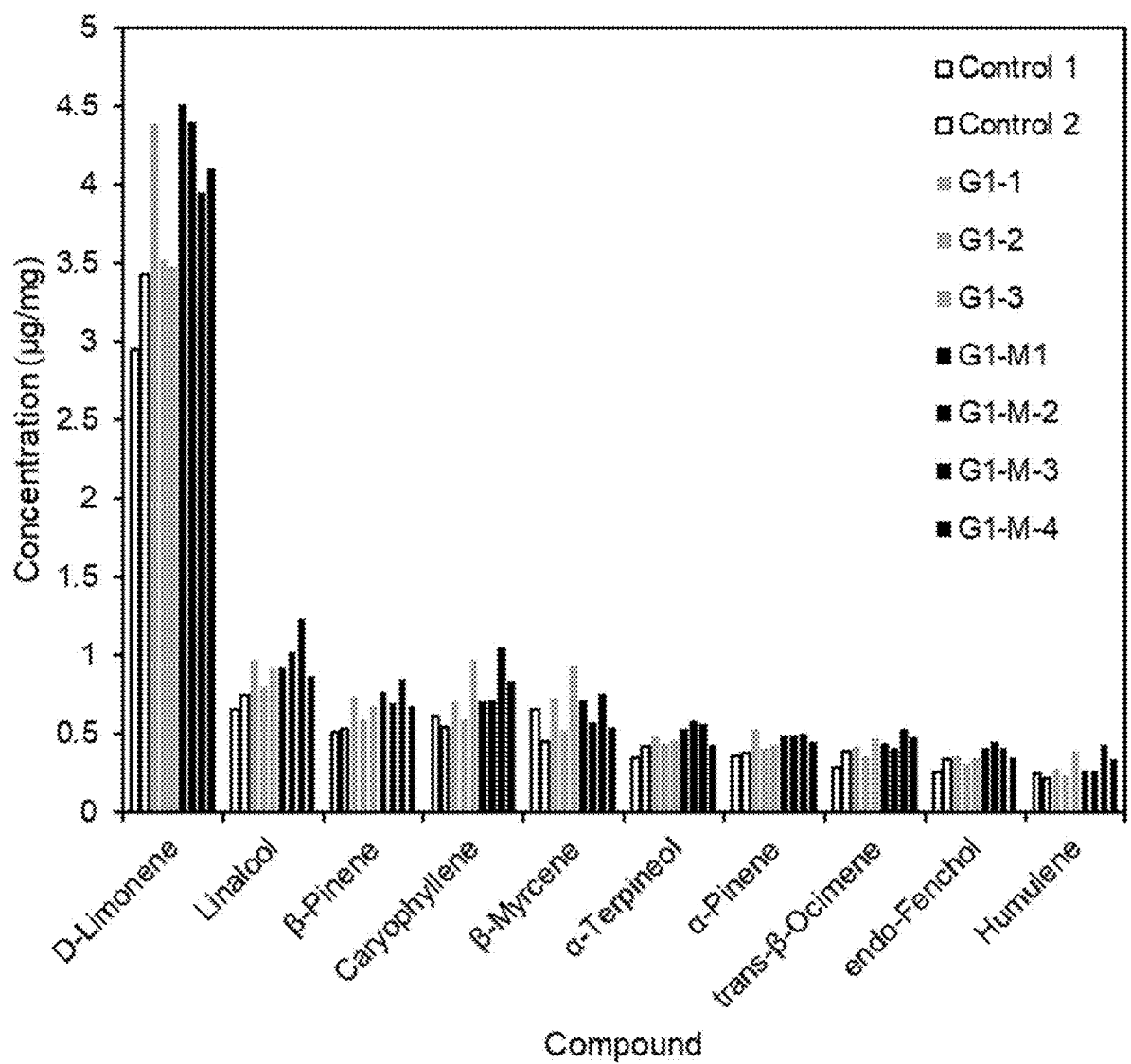
FIG. 7 is a plot illustrating the content of individual aroma compound in weight percent of triplicate samples per individual plants.

When aggregated into respective groups, significant increases for groups G1-M for aroma content were observe relative to the control (FIG. 5). Further, very small deviations for G1-M were observed at the highest measured concentrations—again indicating that melatonin effectively allows plants to perform at their optimal conditions. FIG. 6 illustrates the increases in aroma content in group G1-M relative to G1 and the control groups. FIG. 7 illustrates the increases in a few individual components (top ten) of the aroma compound in group G1-M relative to G1 and the control groups. Three different samples of the plants shown were measured to for each group.

The results indicate that exogenous additives can drastically influence the total content of the *cannabis* plant's essential oil. The present technology demonstrates that using a common base nutrient can have drastically improved cannabinoid production by addition of certain additives. Additionally, it shows that salt-stress can be alleviated by addition of melatonin, resulting in unprecedented consistency in cannabinoid and volatile aroma compound production. Addition of exogenous melatonin increased cannabinoid production relative to the control group at an incredibly consistent rate, thereby showing that this antioxidant can readily enhance secondary metabolite production to allow *cannabis* plants to operate at their optimal efficiency—regardless if salt stressed or not. Taken together, these data suggest that exogenous addition of endogenous antioxidants such a melatonin can enhance secondary metabolite production to increase the content of the *cannabis* plant essential oil. It follows that addition of other naturally or non-naturally occurring antioxidants can effectively increase secondary metabolism in *cannabis*. The methods can be used to increase the production of other desired compounds, e.g., sulfur compounds in *cannabis* and other plants.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method for enhancing the content of an essential oil or a mixture of essential oils in a *cannabis* plant, the method comprising applying to the *cannabis* plant an effective amount of a composition comprising melatonin and potassium sulfate.

2. The method of claim 1, wherein the composition further comprises an antioxidant selected from the group consisting of 6-hydroxymelatonin, N-acetylserotonin, and a mixture thereof.

3. The method of claim 1, wherein the *cannabis* plant is grown in a growth medium and the composition further comprises one or more additive nutrients.

4. The method of claim 3, wherein the *cannabis* plant is grown in a growth medium selected from the group consisting of soil, compost, aeroponic growth media, hydroponic growth media, and a combination thereof.

5. The method of claim 3, wherein the one or more additive nutrients are selected from the group consisting of ammonium sulfate, sodium thiosulfate, ammonium thiosulfate, potassium thiosulfate, potassium nitrate, ammonium nitrate, urea, calcium nitrate, sodium nitrate, and molasses.

6. The method of claim 1, wherein the composition is applied to the *cannabis* plant during cultivation.

7. The method of claim 1, wherein the composition is applied as a foliar spray.

* * * * *